United States Patent [19]
Thompson et al.

[11] Patent Number: 4,897,013
[45] Date of Patent: Jan. 30, 1990

[54] ELECTRICALLY OPERATED MATERIAL HANDLING ATTACHMENT FOR A GARDEN TRACTOR OR THE LIKE

[75] Inventors: Randal H. Thompson; Joseph W. Langenfeld; Neal W. Westendorf, all of Onawa, Iowa

[73] Assignee: Westendorf Mfg. Co., Inc., Onawa, Iowa

[21] Appl. No.: 212,239

[22] Filed: Jun. 27, 1988

Related U.S. Application Data

[63] Continuation of Ser. No. 935,822, Nov. 28, 1986, Pat. No. 4,770,595.

[51] Int. Cl.4 .............................................. B66F 9/00
[52] U.S. Cl. .................................... 414/703; 414/920; 172/453
[58] Field of Search ............... 414/703, 685, 686, 920; 172/453

[56] References Cited

U.S. PATENT DOCUMENTS

| | | | |
|---|---|---|---|
| 2,375,970 | 5/1945 | Williams, Jr. | 280/497 X |
| 2,597,692 | 5/1952 | Wills et al. | 37/126 R |
| 2,628,730 | 2/1953 | Speicher et al. | 414/703 |
| 2,760,284 | 8/1956 | Cook | 414/703 X |
| 4,324,525 | 4/1982 | Lane et al. | 414/699 |
| 4,770,595 | 9/1988 | Thompson et al. | 414/703 |

Primary Examiner—Robert J. Spar
Assistant Examiner—Donald W. Underwood
Attorney, Agent, or Firm—Zarley, McKee, Thomte, Voorhees & Sease

[57] ABSTRACT

A material handling attachment for small vehicles such as a garden tractor, riding lawn mowers, all terrain vehicles, etc. wherein the material handling attachment may be vertically moved by an electrically operated screw ram which may be controlled by either the electrical system on the vehicle or by a storage battery.

1 Claim, 3 Drawing Sheets

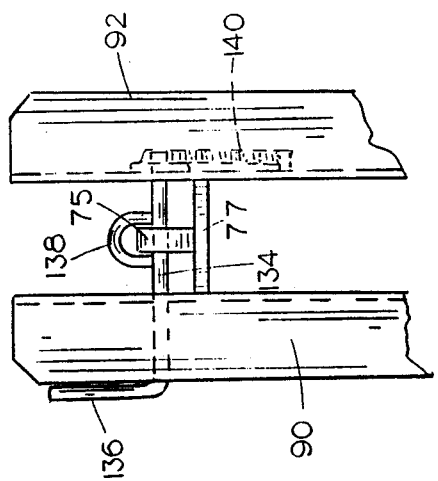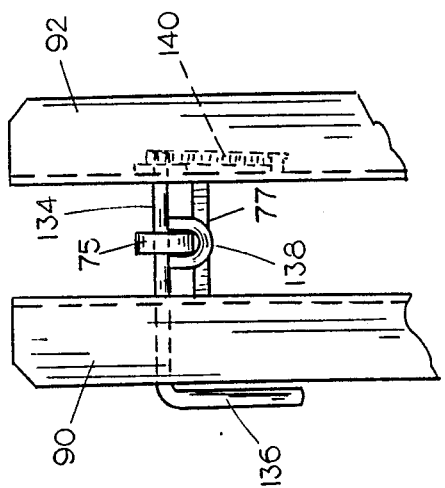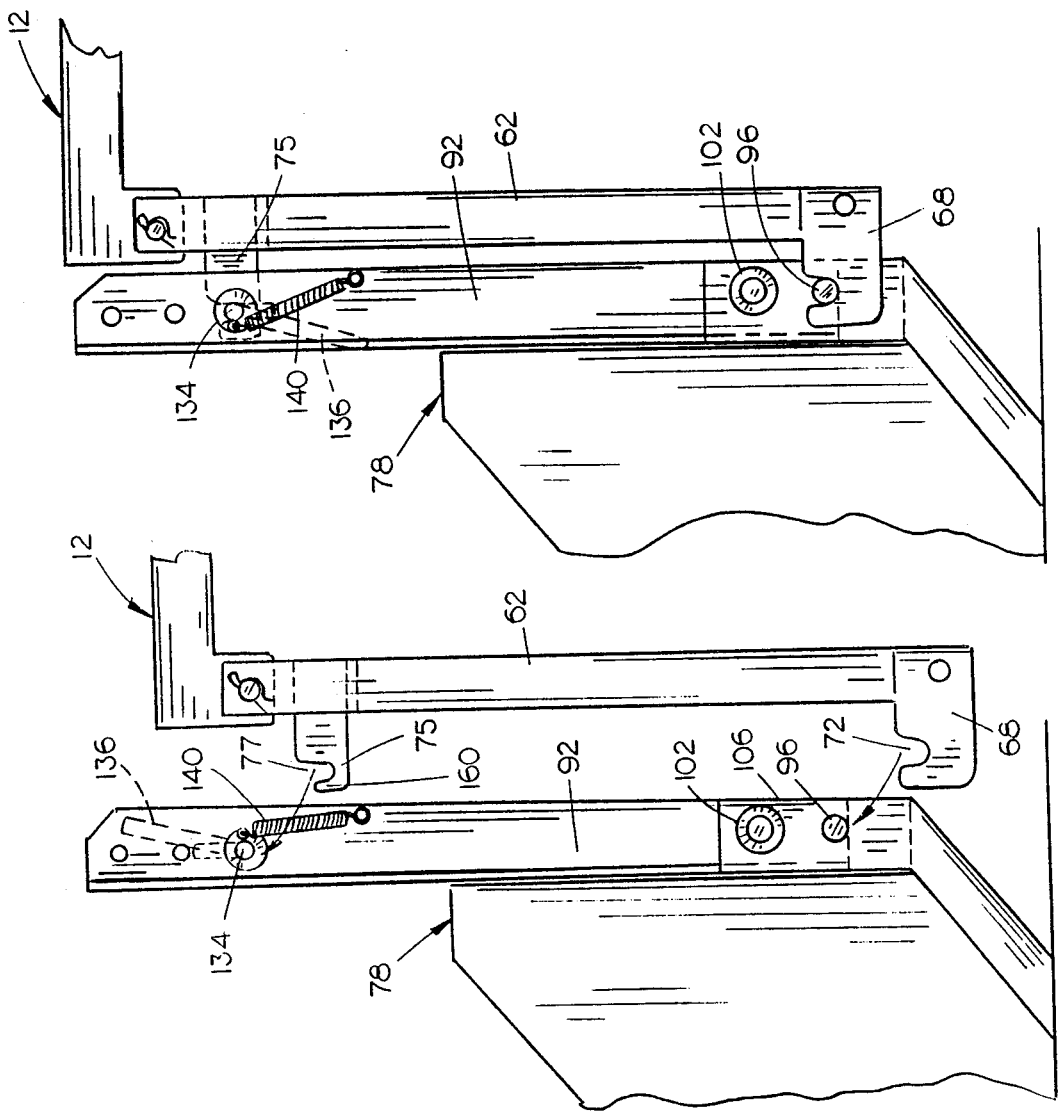

ELECTRICALLY OPERATED MATERIAL HANDLING ATTACHMENT FOR A GARDEN TRACTOR OR THE LIKE

CROSS REFERENCE TO RELATED APPLICATION

This is a continuation-in-part application of Ser. No. 935,822 filed Nov. 28, 1986, entitled AN ELECTRICALLY OPERATED MATERIAL HANDLING ATTACHMENT FOR A GARDEN TRACTOR OR THE LIKE which issued as U.S. Pat. No. 4,770,595, on Sept. 13, 1988.

BACKGROUND OF THE INVENTION

Material handling attachments such as loader buckets or the like have long been used on tractors. The material handling attachment is normally mounted on the forward ends of boom arms which are pivotally secured to a frame means mounted on the tractor. The boom arms are normally pivotally moved upwardly and downwardly by means of hydraulic cylinders which are connected to the hydraulic system of the tractor. Westendorf Manufacturing Company of Onawa, Iowa has recently introduced a series of material handling attachments such as loader buckets which are mounted on the rear end of the tractor and which are vertically moved upwardly and downwardly by means of hydraulic cylinders connected to the tractor hydraulic system.

Small vehicles such as garden tractors, riding lawn mowers, all-terrain vehicles, etc. have not been utilized in combination with loader buckets or the like since they do not have hydraulic systems incorporated therein which could be used to power the hydraulic cylinders necessary to raise and lower the bucket.

It is therefore a principal object of the invention to provide a material handling attachment for a garden tractor or the like which is electrically operated either by the garden tractor electrical system or by a storage battery operatively connected thereto.

A further object of the invention is to provide a material handling attachment for a garden tractor or the like which may be operated even though the garden tractor does not have a hydraulic system incorporated therein.

Still another object of the invention is to provide an electrically operated material handling attachment for a garden tractor or the like which is economical of manufacture, durable in use and refined in appearance.

Yet another object of the invention is to provide an electrically operated material handling attachment for a garden tractor, lawn mower, all terrain vehicle, etc. including means for power dumping the loader bucket when the loader bucket reaches a predetermined height relative to the tractor.

Still another object of the invention is to provide an electrically operated loader bucket for a garden tractor or the like including linkage means which allows the efficient positioning and dumping of the loader bucket.

Still another object of the invention is to provide an electrically operated material handling attachment for a garden tractor or the like which is economical of manufacture, durable in use and refined in appearance.

These and other objects will be apparent to those skilled in the art.

BRIEF DESCRIPTION OF THE DRAWINGS

FIG. 5 is a partial side elevational view illustrating the quick attach assembly of the invention with the attachment being shown in its unattached condition;

FIG. 6 is a view similar to FIG. 5 except that the quick attach mechanism has been connected;

FIG. 7 is a partial rear view illustrating a locking means for the quick attach connection in its unlocked position; and FIG. 8 is a view similar to FIG. 7 except that the locking means has been moved to its locking position.

SUMMARY OF THE INVENTION

Figure 1:
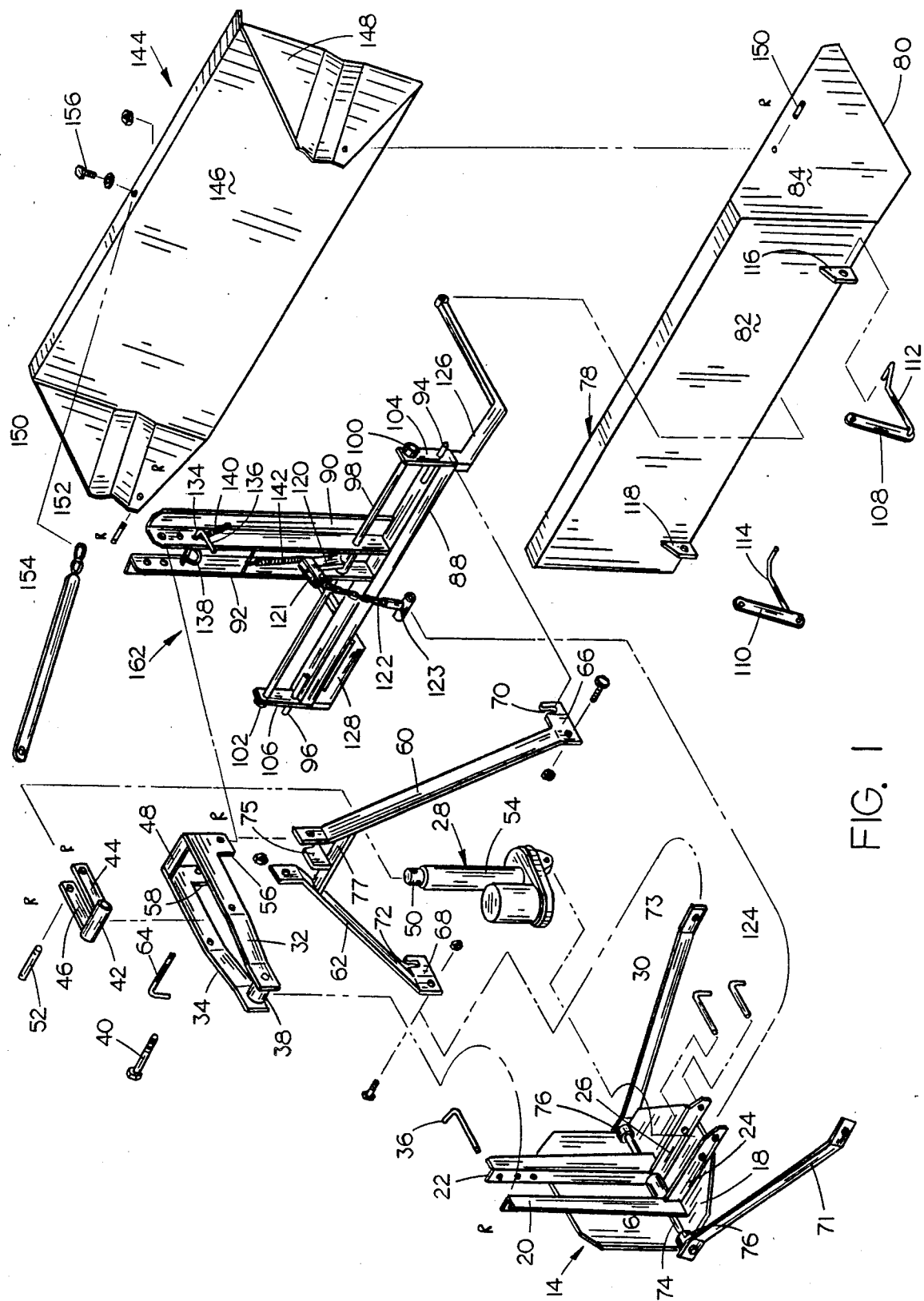
FIG. 1 is an exploded perspective view of the attachment of this invention.

A material handling attachment for a small vehicle such as a garden tractor, riding law mower, all terrain vehicle, etc. is disclosed which enables the attachment to be vertically moved relative to the garden tractor even though the garden tractor does not have a hydraulic system which would normally be required to power such an attachment. In the instant invention, a support means is mounted on either the rearward or forward ends of the tractor and has an electrically operated screw ram or screw jack mounted thereon. When the support means is mounted on the rearward end of the vehicle, an elongated arm means is pivotally secured at its forward end to the support means and extends rearwardly therefrom. A pair of horizontally spaced-apart arms are pivotally secured at their forward ends to the support means and extend rearwardly therefrom. An inverted, substantially V-shaped brace assembly pivotally interconnects the rearward ends of the elongated arm means and the spaced-apart arms. The upper end of the screw ram means is operatively connected to the elongated arm means so that extension of the screw ram means causes the elongated arm means, inverted V-shaped brace assembly and arms to be vertically moved upwardly. The brace assembly includes a quick attach hook means mounted thereon which is adapted to be quickly and easily attached to a support structure which is operatively pivotally secured to the loader bucket. A linkage means is provided for automatically power dumping the loader bucket when the screw ram means has moved the bucket to a predetermined height. An optional pivotal end wall assembly is provided for closing the rearward end of the loader bucket when the bucket is in its lowermost position. When the bucket has been raised and is dumped, the material is permitted to fall from the open forward end of the bucket.

DESCRIPTION OF THE PREFERRED EMBODIMENT

The numeral 10 refers to a small tractor which is the preferred vehicle upon which the apparatus of this invention is to be mounted. However, the apparatus of this invention may be mounted on riding law mowers, all terrain vehicles, etc. which normally do not have hydraulic systems provided thereon.

In the drawings, the numeral 12 refers to the material handling apparatus of this invention which may be mounted on either the forward or rearward ends of the vehicle 10. For purposes of description, the apparatus 12 will be described as being mounted on the rearward end of the vehicle 10 but it should be understood that it could be mounted on the forward end of the vehicle with equal ease. Apparatus 12 includes a support 14 which is secured to the tractor and which includes a vertically disposed portion 16 having a horizontally disposed portion 18 extending rearwardly from the lower end thereof. A pair of upstanding posts or angle members 20 and 22 extend upwardly from portion 18 and are welded thereto as well as being welded to portion 16 as seen in the drawings. A pair of spaced-apart plates 24 and 26 are secured to the lower ends of angle members 20 and 22 respectively by welding and extend rearwardly therefrom along the upper surface of portion 18 to which they are also welded.

The lower end of a conventional electrically operated ram 28 is pivotally secured to the plates 24 and 26 by means of pin 30. A pair of arms 32 and 34 are pivotally secured to the upper ends of angle members 20 and 22 by pin 36 and bushing 38 and extend rearwardly therefrom. Bolt 40 extends through arms 32 and 34 forwardly of the rearward ends thereof and has a sleeve or collar 42 rotatably mounted thereon. A pair of fingers 44 and 46 are welded to sleeve 42 and extend rearwardly therefrom beneath plate 48 which is welded to and which extends between the rearward ends of arms 32 and 34. The upper end of rod 50 of ram 28 is pivotally secured to the rearward ends of fingers 44 and 46 by pin 52. As seen in the drawings, extension of rod 50 from body 54 of ram 28 causes the fingers 44 and 46 to engage the underside of plate 48 to cause the arms 32 and 34 to be pivotally moved upwardly relative to angle members 20 and 22.

As seen in the drawings, the rearward ends of arms 32 and 34 are provided with downwardly extending portions 56 and 58 respectively. The upper ends of braces 60 and 62 are secured to the downwardly extending portions 56 and 58 by means of pin 64. As seen in FIG. 1, braces 60 and 62 extend downwardly and outwardly from the downwardly extending portions 56 and 58 respectively and have rearwardly extending lower end portions 66 and 68 at their lower ends which are provided with upwardly presented U-shaped openings 70 and 72 for a purpose to be described hereinafter. The rearward ends of arms 71 and 73 are secured to the lower ends of braces 60 and 62 by suitable bolts as seen in FIG. 1. Finger 75 extends rearwardly from brace 77 and has an upwardly presented opening 79 formed therein. The forward ends of arms 71 and 73 are secured to the opposite ends of shaft 74 which is rotatably mounted in spaced-apart collars 76 which are welded to the support 14.

The numeral 78 refers to a loader bucket which is the preferred materials handling attachment to be utilized on the apparatus of this invention although other attachments such as blades, etc. could be substituted for the bucket. Bucket 78 includes a bottom 80, front wall 82, and opposite side walls 84. Apparatus 12 also includes an assembly 84 which is pivotally secured to the bucket 78 as will now be described. Assembly 84 includes a horizontally disposed support member 88 having a pair of upstanding posts 90 and 92 in the form of angle members secured thereto and extending upwardly therefrom. Shaft stubs 94 and 96 extend horizontally outwardly from the opposite ends of support member 88 as seen in FIG. 1. Shaft 98 is rotatably mounted in posts 90 and 92 and has its opposite ends rotatably mounted in collars 100 and 102 which are secured to the opposite ends of support member 88 by bracket 104 and 106. Link arms 108 and 110 are welded to the outer ends of shaft 98 for rotation therewith. One end of link arms 112 and 114 is pivotally connected to the ends of link arms 108 and 110 respectively. The other ends of link arms 112 and 114 are pivotally secured to ears 116 and 118 which are welded to the front sides of front wall 82. An actuator cam 120 is welded to shaft 98 between posts 90 and 92 and has one end of finger 121 welded thereto. Chain 122 is secured to finger 121 by any convenient means. The other end of chain 122 has a collar 123 secured thereto. Chain 122 is detachably secured to the forward ends of plates 24 and 26 by pin 124 extending through collar 123. Arms 126 and 128 are rigidly secured to the outer ends of support member 88 and are pivotally secured to the underside of the bottom 80 of bucket 78 at 130 (FIG. 3) and 132 (not shown), respectively. Pin 134 is selectively rotatably mounted in the upper ends of posts 90 and 92 and has an actuator handle portion 136 at one end thereof. A U-shaped retainer or lock 138 is secured to pin 134 between posts 90 and 92. Spring 140 is operatively connected to the pin 134 to urge the pin 134 into its locking position as will be described in more detail hereinafter. Spring 142 is operatively secured to cam 120 to aid in returning cam 120 to the position seen in FIG. 1.

Figure 4:
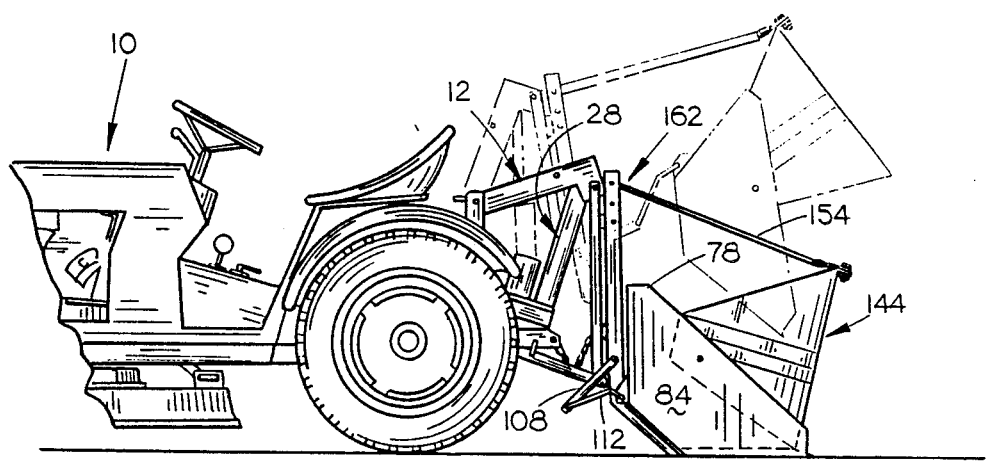
FIG. 4 is a view similar to FIGS. 2 and 3 except that an optional end wall assembly is shown to be mounted on the loader bucket.

An optional end wall assembly 144 for the bucket 78 is also shown in FIGS. 1 and 4. End wall assembly 144 includes end wall 146 having side walls 148 and 150 extending forwardly from the opposite ends thereof. Side walls 148 and 150 are pivotally secured to side walls 84 of bucket 78 by bolts or pins 151 and 152. An elongated arm 154 has its forward end pivotally secured to pin 64 and has its rearward end secured to end wall 146 by bolt assembly 156.

Assuming that the loader bucket 78 and its supporting structure are not mounted on the tractor and the support structure mounted thereon, the apparatus is connected as follows. The tractor would be moved rearwardly relative to the loader bucket and its supporting structure. Stubs 94 and 96 are positioned in the U-shaped openings 70 and 72 respectively and pin 134 is positioned in the U-shaped opening 77 as illustrated in FIG. 7. Actuating handle 136 is then rotated to cause U-shaped portion 138 to pivot relative to the "hook" portion 160 of finger 75 so that relative movement between finger 75 and pin 134 is prevented to lock the assembly 162 onto the tractor supporting structure. Collar 123 is then secured to the rearward ends of arms 24 and 26 by means of pin 124. The rearward end of arm 154 is secured to pin 52.

Figure 2:
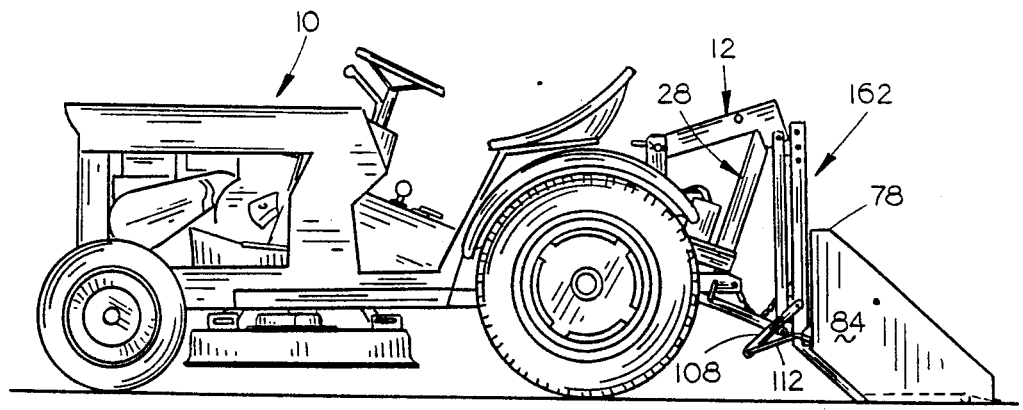
FIG. 2 is a side view illustrating the attachment mounted on a small vehicle such as a riding lawn mower with the attachment being illustrated in its lowermost position.

Actuation of the ram 28 by the tractor electrical system or by a storage battery causes the rod 50 to be extended from the ram 28. Extension of ram 50 causes the fingers 44 and 46 to move upwardly to engage the underside of plate 48 which causes the arms 32 and 34 to be raised which causes the assembly 162 to be raised as well as the loader bucket 78. As the loader bucket is raised, collar 123 is held in position relative to the tractor which causes the cam 120 to rotate in a counterclockwise manner as viewed in FIG. 1 so that shaft 98 is rotated in a counterclockwise direction. Rotation of shaft 98 causes the link arms 108 and 110 to be pivotally moved in a counterclockwise direction which causes the link arms 112 and 114 to be moved forwardly thereby causing bucket 78 to be pivotally moved from its working position of FIG. 2 to the dumping position of FIG. 3. The bucket is "power dumped" through the linkage interconnecting the bucket and its supporting structure without any action required on the part of the operator.

When the optional end wall assembly 144 is employed as illustrated in FIG. 4, the dumping of the bucket opens the rearward end of the bucket so that material therein may fall therefrom since the end wall assembly is held in position relative to the bucket as the bucket dumps.

Figure 3:
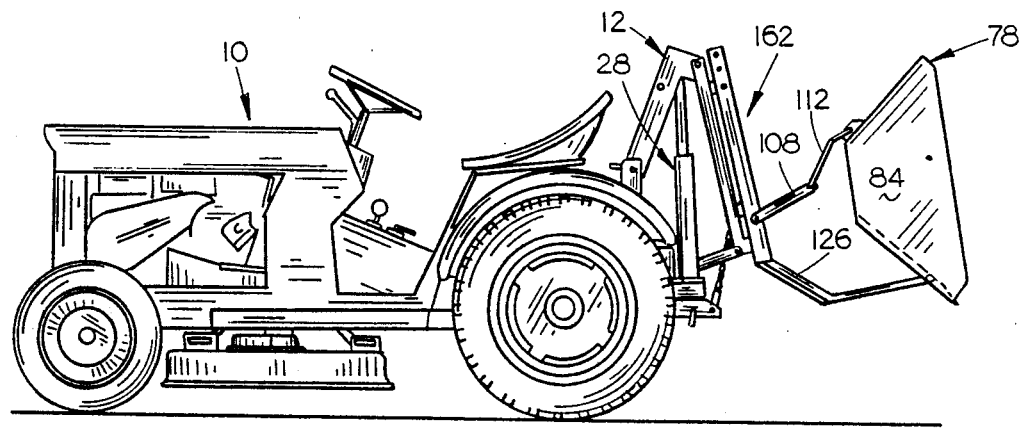
FIG. 3 is a view similar to FIG. 2 except that the loader bucket has been raised from the position of FIG. 2 and moved to its dumping position.

After the bucket has been dumped as illustrated in FIG. 3, the ram 28 is lowered. As the bucket is lowered, chain 122 becomes slack and the spring 142 aids in initially returning cam 120 towards its original position. The ram 28 is lowered until the bucket engages the ground which causes the link arms 108, 110, 112 and 114 to be moved to the position of FIG. 2. The operation of the link arm assembly is more fully described in the co-pending application, Ser. No. 814,043 filed Dec. 27, 1985.

It can therefore be seen that a novel means has been provided which permits a conventional garden tractor, riding lawn mower, all terrain vehicle, etc. to be modified somewhat so that a materials handling attachment such as a loader bucket or the like may be mounted thereon. The loader bucket is vertically moved relative to the tractor by means of an electrically operated screw ram which may be either electrically connected to the tractor's electrical system or to a storage battery if the tractor does not have an electrical system. It has also been shown that the attachment may be quickly and easily mounted on the supporting structure so that the supporting structure may accommodate various types of materials handling attachments.

While the ram means 28 has been described as a purely electrically operated mechanical ram means, it should be noted that the ram means could be hydraulically operated but electrically controlled. In other words, the ram means could be a completely self-contained hydraulic ram means which is electrically operated. It can therefore be seen that the invention accomplishes at least all of its stated objectives.

I claim:
1. In combination,
   a wheeled vehicle having rearward and forward ends, said vehicle including an electrical power source,
   a support means mounted on one of said rearward and forward ends,
   a vertically movable multiple-point hitch assembly secured to said support means, said assembly being movable between upper and lower positions,
   a materials handling bucket pivotally mounted on said assembly and being movable between dumping and working positions,
   an electrically operated ram means operatively connected to said assembly for raising and lower said assembly and said materials handling bucket,
   linkage means operatively connecting said bucket and said assembly for pivoting said bucket, relative to said assembly, from said working position to said dumping position,
   and a mechanical actuator means operatively connected to said linkage means for automatically power pivoting said bucket to said dumping position when said ram means has raised said assembly and said bucket to a predetermined height,
   said actuator means comprising an elongated flexible member having one end operatively fixed against vertical movement, the other end of said flexible member being secured to said linkage means,
   said flexible member having a length such that it will be slack when said bucket is in its working position and said assembly is in its said lower position, and such that it will become taut to cause said linkage means to pivot said bucket to its dumping position when said assembly has reached said predetermined height.

* * * * *